United States Patent [19]

Wirth

[11] Patent Number: 4,914,961

[45] Date of Patent: Apr. 10, 1990

[54] DEVICE FOR FASTENING A VIBRATING WIRE TO A COMPONENT OF A METER

[75] Inventor: Johannes Wirth, Zurich, Switzerland

[73] Assignee: Wirth Gallo Messtechnik AG, Zurich, Switzerland

[21] Appl. No.: 84,331

[22] Filed: Aug. 11, 1987

[30] Foreign Application Priority Data

Aug. 19, 1986 [EP] European Pat. Off. ........ 86 810369.8

[51] Int. Cl.⁴ .......................... G01L 1/10; F16G 11/04
[52] U.S. Cl. ............................. 73/862.59; 73/DIG. 1; 24/115 L
[58] Field of Search ................... 73/DIG. 1, 704, 778, 73/517 AV, 862.59, 828, 833, 856, 859, 860; 177/210 FP; 24/115 R, 115 L, 136 R; 84/297 R; 324/80; 331/156

[56] References Cited

U.S. PATENT DOCUMENTS

| 1,900,038 | 3/1933 | Bower | 331/156 X |
| 2,604,787 | 7/1952 | Coyne et al. | 73/DIG. 1 |
| 3,107,523 | 10/1963 | Oliver, Jr. et al. | 73/860 |
| 3,247,565 | 4/1966 | Griffin | 73/859 |
| 3,994,521 | 11/1976 | Van Gompel | 24/136 A X |

Primary Examiner—Charles A. Ruehl
Attorney, Agent, or Firm—Johnson & Gibbs

[57] ABSTRACT

Device for fastening a vibrating wire to a component of a meter. The device comprises a body having two prongs and two cylindrical, conical, prismatic or wedge-shaped retainers made of electrically insulating material. The retainers are in contact with the prongs on one side and, due to the clamping action of the prongs, hold the full width of the wire by friction on the other side, insulating it electrically.

16 Claims, 2 Drawing Sheets

DEVICE FOR FASTENING A VIBRATING WIRE TO A COMPONENT OF A METER

BACKGROUND OF THE INVENTION

1. Field of the Invention

The present invention pertains to a device for fastening a vibrating wire and, more particularly, to a device for fastening a vibrating wire to a component of a measuring device or meter such as a dynamometer, for example.

2. History of the Prior Art

Measuring devices or meters which use vibrating wires for a frequency transmitter are described in Swiss Patent No. 447,653, for instance. The frequency of such wires is determined not only by their mass, length and tension, but also by the type of fastener with which they are attached to other components of the measuring device. Moreover, the wires must be electrically insulated from the energy transmission chain at one end at least.

German Patent No. 2,239,997 describes a fastening device which meets most of the claims for the mechanism fastening wire to other components of a meter. In particular, the two ends of the wire form nodes of oscillation, and the wire is attached to the connectors in such a way that virtually no energy of oscillation is lost in friction. If the wire must also be electrically insulated, this is accomplished by means of an insulated screw connection, which electrically insulates the connector parts from the other components of the meter or measuring device. However, when the connection must be absolutely reliable, this type of connection becomes very costly.

The purpose of the invention is to provide a more economical way of dependably insulating the wire electrically from the other components of the measuring device or meter without sacrificing the advantages of this fastening mechanism. These advantages include formation of a node of oscillation at the point of fastening, the ability of the fastening device to function as a stop band filter between the wire and the energy transmission chain, and the elimination of energy loss in mechanical friction.

The present invention overcomes the problems of the prior art with a fastening device consisting of a body with two prongs and two retainers made of an insulating material in which the retainers contact the prongs on one side and, due to the clamping action of the prongs, hold the full width of the wire by friction on the other side, insulating it electrically.

SUMMARY OF THE INVENTION

The present invention pertains to a device for fastening a vibrating wire to a component of a meter, characterized by a body having two prongs and two cylindrical, conical, prismatic or wedge-shaped retainers. The retainers are made of electrically insulating material in which the retainers are in contact with the prongs on one side and due to the clamping action of the prongs hold the full width of the wire by friction on the other side insulating it electrically.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
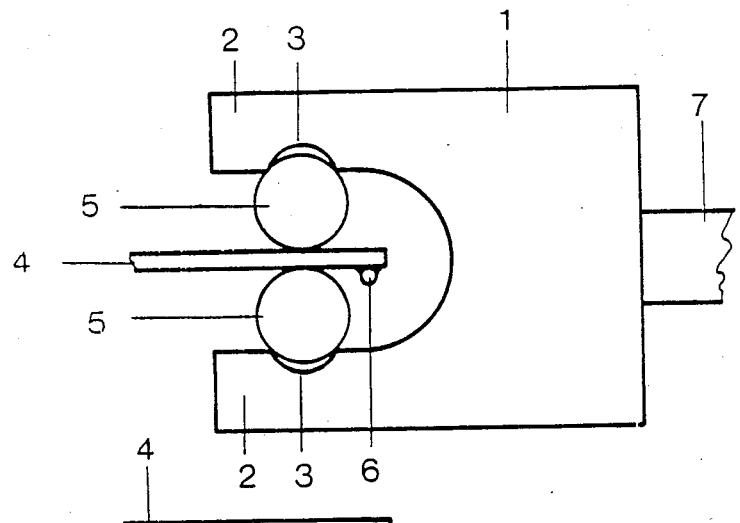
FIG. 1 is a top-plan view of one embodiment of the fastening device of the present invention.

In the variant shown in FIG. 1, the fastening device consists of a heavy, U-shaped body 1, each of whose arms forms a prong 2 containing a groove whose cross-section is the arc of a circle. The wire 4 is clamped between two cylindrical sapphires 5. The diameter of the sapphire 5 is larger than the diameter of the groove 3. The end of the wire 4 is connected by means of a terminal 6 to the electrical part of the meter (in a manner that is not shown) in such a way that no forces are transmitted to the wire 4.

The various parts are so designed that under the lateral thrust of the sapphires 5 and wire 4, the prongs 2 of the body 1 are elastically deformed and thus exert a permanent elastic clamping action, holding the sapphires 5 and wire 4 together and pressing them against each other by friction across the entire width of the wire 4. Contact between the sapphires 5 and the grooves 3 is established along the two generatrices of the sapphires 5. In a design which is already known, the ends of the wire 4 have a square cross-section so that contact between the wire 4 and the sapphires 5 is established along a generatrix. In practice, however, due to relative high compression, a plastic deformation of the ends of the wire 4 takes place along this generatrix such that contact with the sapphires 5 takes place along a narrow, straight area. The body 1 and prongs 2 must be designed so that the compressive force exerted along the generatrices of the sapphires 5 by the prongs 2 is uniform. Further, the surface finish of the sapphires 5 and wire 4 must be such that the abovementioned contact area is sufficiently narrow and the compressive force along the contact area also remains uniform. So long as these conditions are met, virtually no energy of oscillation is lost in friction.

FIG. 1 shows a schematic illustration of the first element 7 in the energy transmission chain. The measuring force exerted on the wire 4 is transmitted along this energy transmission chain. Depending on the meter design, the body 1 may be connected to the energy transmission chain with a spring, for instance, as the first element 7 of the chain as a mechanical stop band filter in order to insulate the wire 4 mechanically in its frequency band from its environment.

Instead of cylindrical sapphires, conical sapphires could also be used. In this case, the grooves 3 would have to match the angle of the cone in order to effect contact along the generatrix. Insulating materials other than sapphires could also be used, such as ceramics, for examples.

Figure 2:
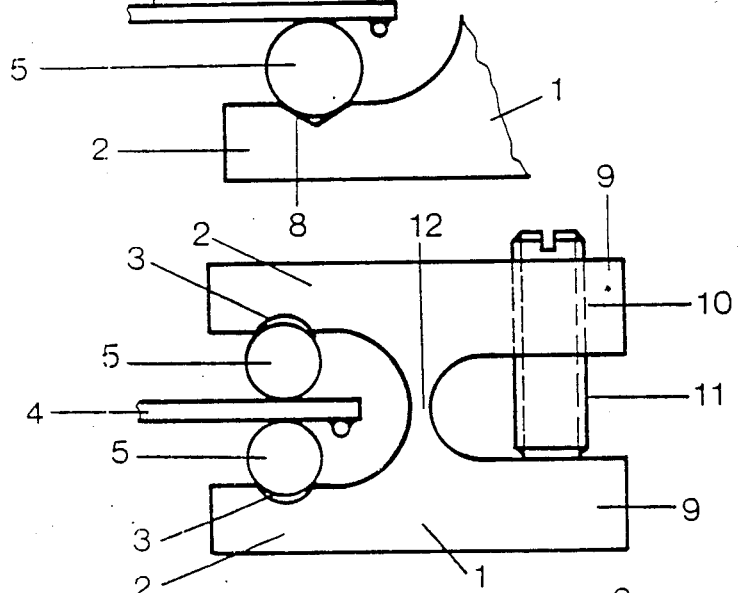
FIG. 2 is a fragmentary view of an alternative embodiment of the fastening device of FIG. 1.

FIG. 2 illustrates a variant of groove design in the prongs 2. Instead of a cross-section in the form of an arc, the grooves 8 may have a triangular cross-section. The sapphires 5 then contact each side of the groove 8 along a generatrix.

Figure 3:
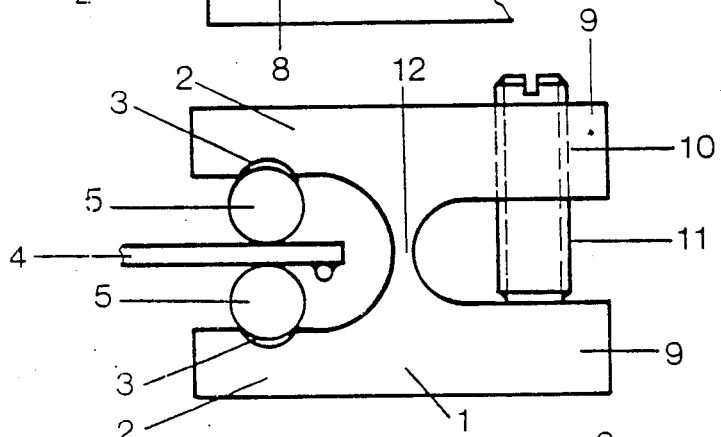
FIG. 3 is an alternative embodiment of the fastening device of FIG. 1.

The sapphire/wire assembly may be installed between the prongs 2 by overcoming the compressive force of the prongs 2 or, if the prongs 2 are properly dimensioned, the assembly may be installed without using force. FIG. 3 shows a sample design in which the sapphire/wire assembly can be installed without applying force. However, in order to enable the prongs to provide the required clamping action, the prongs 2 must be extended in length 9. The upper prong 9 has a threaded hole 10 and a bolt 11 whose end contacts the inside surface of the lower prong 9. The waist 12 of the body 1 is designed to be sufficiently flexible so that when the bolt 11 is tightened, the extensions 9, the waist 12 and the prongs 2 will be elastically deformed, providing the required clamping action.

Figure 4:
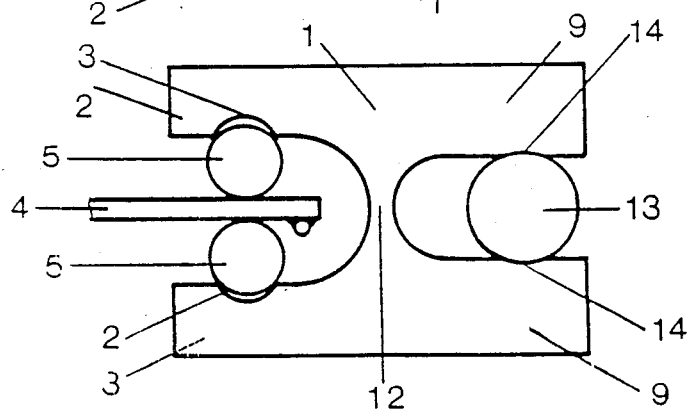
FIG. 4 is an alternative embodiment of the fastening device of FIG. 1.

FIG. 4 shows a sample design in which the bolt 11 of FIG. 3 is replaced by a ball 13. The ball 13 is pressed into the two recesses 14 in the extensions 9. The effect of this is the same as that of the bolt 11, and at a given value of elasticity for the other parts, the diameter of the ball 13 determines the amount of clamping force.

Figure 5:
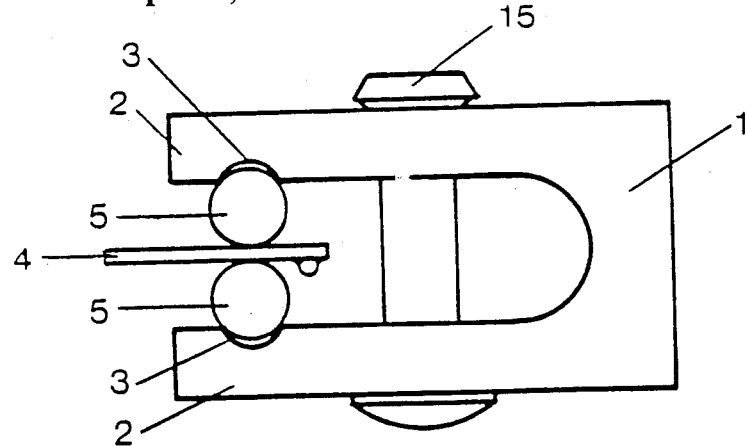
FIG. 5 is an alternative embodiment of the fastening device of FIG. 1.

FIG. 5 shows a third sample design in which the same result is achieved by using a rivet 15 to bring the two prongs 2 closer together to provide the necessary compressive force. A nut and bolt could also be used instead of a rivet.

Figure 6:
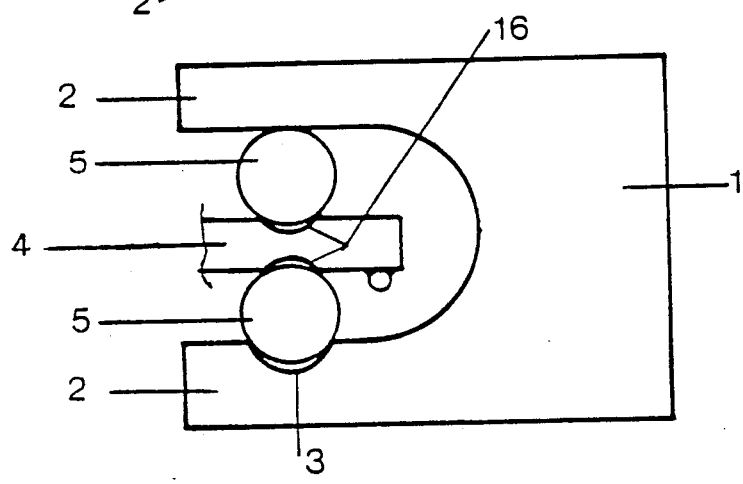
FIG. 6 is an alternative embodiment of the fastening device of FIG. 1.

FIG. 6 illustrates a sample design in which only the lower prong 2 has a groove 3. This design can be employed when the wire 4 or the end of the wire is thick enough that two transversal grooves 16 can be made in it. The lower sapphire 5 establishes contact along two generatrices with both the groove 3 in the lower prong 2 and the lower groove 16 in the end of the wire. The upper sapphire 5 establishes contact along two generatrices with the upper groove 16 and along a single generatrix with the upper prong 2. A clamping action can be achieved so that even when the wire 4 is loaded, the upper sapphire 5 will not slip.

Figure 7:
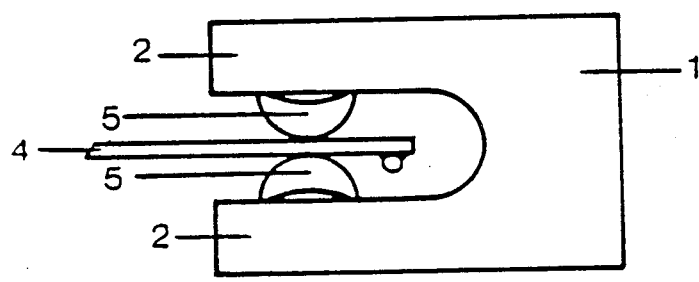
FIG. 7 is an alternative embodiment of the fastening device of FIG. 1.
Figure 8:
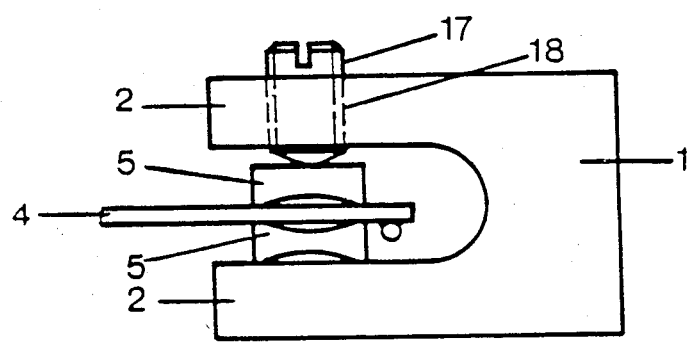
FIG. 8 is an alternative embodiment of the fastening device of FIG. 1.

FIGS. 7 and 8 illustrate sample designs in which neither prong 2 is grooved. In the sample design shown in FIG. 7, the sapphires 5 have a half-moon-shaped transversal cut such that they establish contact with the inner surfaces of the prongs 2 along two straight lines and with the wire 4 along a single straight line. In the sample design shown in FIG. 8, prismatic sapphires 5 are employed. The upper sapphire 5 has a flat upper surface and a concave lower surface, while both surfaces of the lower sapphire 5 have concave surfaces. The upper prong 2 has a threaded hole 17 and bolt 18, by means of which the clamping action can be adjusted. The wire 4 is held in place across its entire width by the two sapphires, each of which grip the wire along two straight lines. The lower sapphire 5 also rests on the lower prong 2 along two straight lines.

It has been illustrated and explained how one end of a wire in an energy transmission chain may be attached. Obviously, the invention could be used to attach both ends of the wire.

What is claimed is:

1. An apparatus for fastening a vibrating wire to a component of a meter, characterized by a body (1) with two prongs (2) and two retainers (5) made of electrically insulated material, in which the retainers (5) are in contact with the prongs (2) on one side and, due to the clamping action of the prongs (2), hold the full width of the wire (4) by a friction on the other side, insulating it electrically.

2. The apparatus as set forth in claim 1 wherein said retainers are conical in shape.

3. The apparatus as set forth in claim 1 wherein said retainers are prismatic in shape.

4. The apparatus as set forth in claim 1 wherein said retainers are cylindrical in shape.

5. The apparatus as set forth in claim 1 wherein said clamping action of said prongs (2) comprises elastic deformation of said prongs one from the other.

6. The apparatus as set forth in claim 1 and further including first and second apertures formed through said prongs and said apparatus further includes a rivet (15) received through said apertures bringing said two prongs (2) closer together to provide said clamping action of the prongs (2).

7. The apparatus as set forth in claim 2 wherein at least one of said prongs includes a threaded hole (17) formed therein and said apparatus further includes a bolt (18) received therethrough for clamping against said retainers.

8. The apparatus as set forth in claim 1 wherein said prongs (2) are each formed with an extending section wherein at least one of said extending prongs (9) is constructed with a threaded hole (10) and said apparatus further includes a bolt (11) received within said threaded hole (10) abuttingly engaging the opposite one of said prongs (9) for spreading said prongs (9) for adjusting the clamping action of the prongs (2) about the wire (4).

9. An apparatus as described under claim 1, characterized by the fact that the prongs (2) are both constructed into extended prongs (11) and said apparatus further includes a ball (13) for the purpose of elastically deforming the body (1) by introducing said ball (13) between said prongs (11) and thus adjusting the clamping action of the prongs (2).

10. Apparatus for fastening a vibrated string (4) with rectangular cross section to a component of a meter, said apparatus comprising:
   a U-shaped body (1) forming two prongs (2);
   two retainers (5) made of electrically insulating material;
   at least one of the prongs (2) having a groove (3) facing the string (4), said groove (3) being perpendicular to the axis of the string (4); and
   each of the retainers (5) on a first side being in contact with a prong (2) and on a second side in contact with said string (4) and securely clamping said string (4) over its entire width by means of the force exerted upon them by the two prongs (2), thereby providing a frictional and electrically insulating connection of the string (4) to the body (1).

11. The apparatus as set forth in claim 10 wherein said retainers (5) are cylindrical in shape.

12. The apparatus as set forth in claim 11 wherein said groove (3) has a cross-section formed of a circular arc the radius of which is smaller than the radius of said cylindrical retainer (5).

13. The apparatus as set forth in claim 10, wherein said retainers (5) are conical in shape.

14. The apparatus as set forth in claim 13 wherein said groove (3) has a cross-section formed of a circular arc the radius of which is smaller than the smaller radius of said conical retainer (5).

15. The apparatus as set forth in claim 10 wherein said body (1) and said prongs (2) are dimensioned such as the provide the necessary elastic clamping forces for fastening said string (4).

16. An apparatus for fastening a vibrating wire to a component of a meter, characterized by a body (1) with two prongs (2) and two conical retainers (5) made of electrically insulated material, in which the conical retainers (5) are in contact with the prongs (2) on one side and, due to the clamping action of the prongs (2), hold the full width of the wire (4) by a friction on the other side, insulating it electrically.

* * * * *